A. WANNER, Jr.

CHAIR.

APPLICATION FILED MAR. 21, 1911.

Reissued Apr. 2, 1912.

13,396.

3 SHEETS—SHEET 1.

WITNESSES

Wm. D. Bell.

Elsie Kaufmann

INVENTOR,

Albert Wanner, Jr.,

BY

ATTORNEY

COLUMBIA PLANOGRAPH CO., WASHINGTON, D. C.

A. WANNER, JR.

CHAIR.

APPLICATION FILED MAR. 21, 1911.

Reissued Apr. 2, 1912.

13,396.

3 SHEETS—SHEET 2.

WITNESSES

Wm. D. Bell.

Elie Kaufmann.

INVENTOR,

Albert Wanner, Jr.,

BY

John Ewin Durand.

ATTORNEY.

COLUMBIA PLANOGRAPH CO., WASHINGTON, D. C.

A. WANNER, Jr.

CHAIR.

APPLICATION FILED MAR. 21, 1911.

Reissued Apr. 2, 1912.

13,396.

3 SHEETS—SHEET 3.

WITNESSES

Wm. Dell.

Elie Kaufmann

INVENTOR,

Albert Wanner, Jr.,

BY

J. Bruce Durand.

ATTORNEY.

COLUMBIA PLANOGRAPH CO., WASHINGTON, D. C.

UNITED STATES PATENT OFFICE.

ALBERT WANNER, JR., OF HOBOKEN, NEW JERSEY.

CHAIR.

13,396. Specification of Reissued Letters Patent. Reissued Apr. 2, 1912.

Original No. 950,974, dated March 1, 1910, Serial No. 453,323. Application for reissue filed March 21, 1911. Serial No. 616,044.

*To all whom it may concern:*

Be it known that I, ALBERT WANNER, Jr., a citizen of the United States, residing in Hoboken, Hudson county, and State of New Jersey, have invented certain new and useful Improvements in Chairs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to chairs and particularly to bent-wood chairs having, instead of the usual ring for supporting the legs, a brace of the type shown in my U. S. Letters Patent No. 819,478, the object being to strengthen the chair generally and reinforce the back legs in particular, especially against the tendency to loosen from the seat or break under sidewise or twisting strains. The invention is not limited in its application to chairs of the kind particularly set forth above, however, being applicable also to other types of chairs, as will be obvious.

Figure 1:
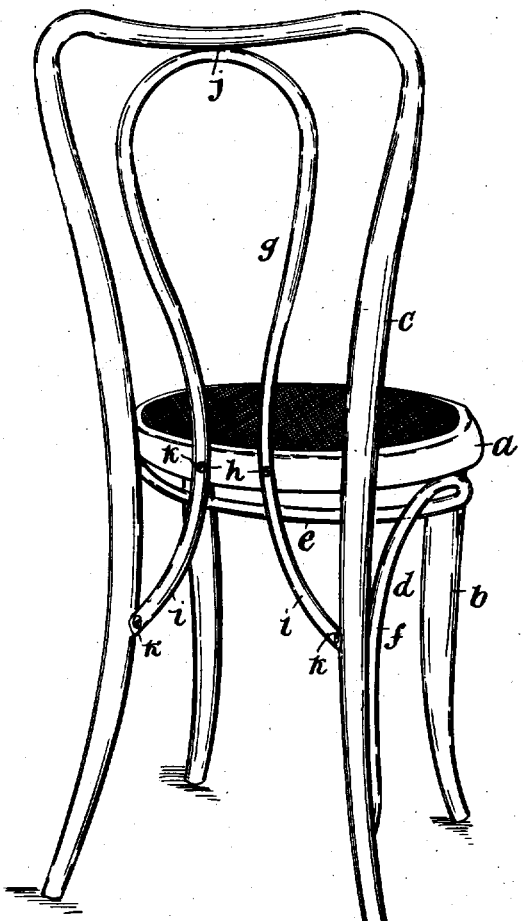
Figure 3:
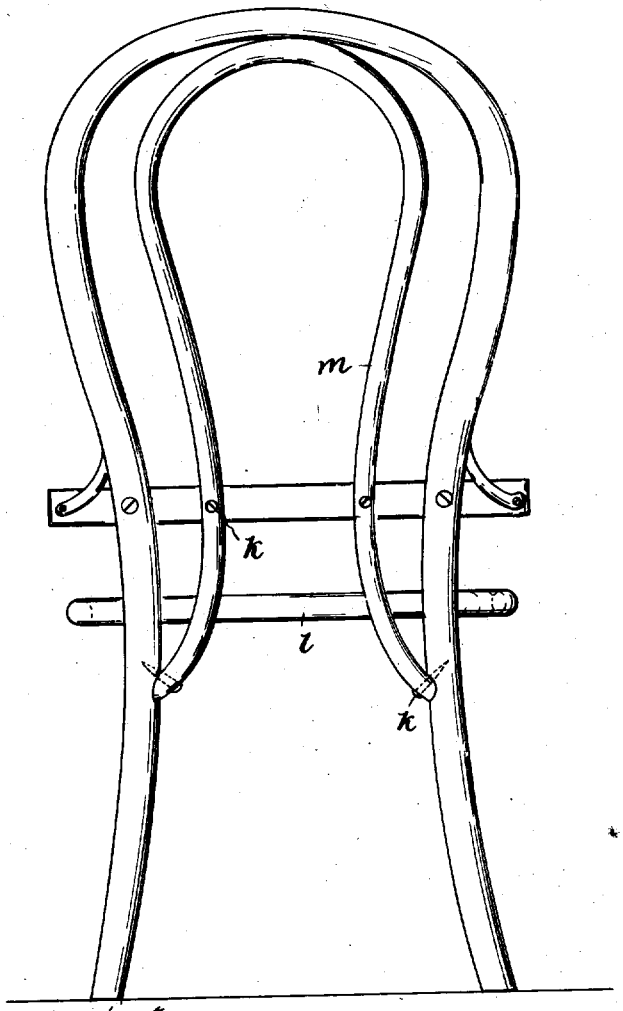
Figure 2:
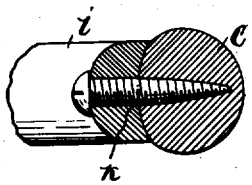
Figure 4:
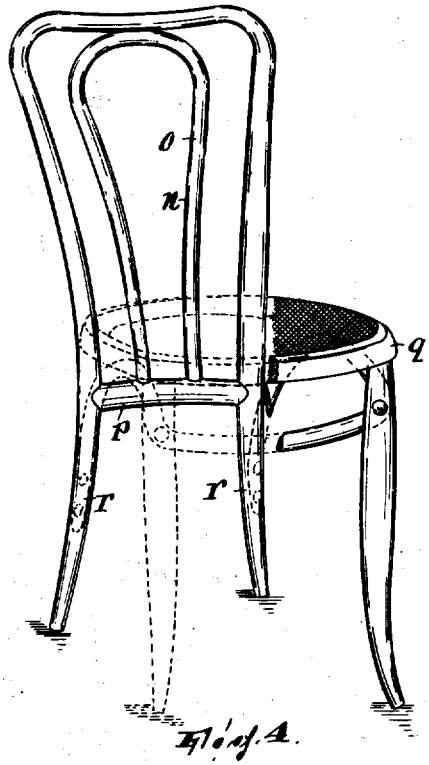
Figure 5:
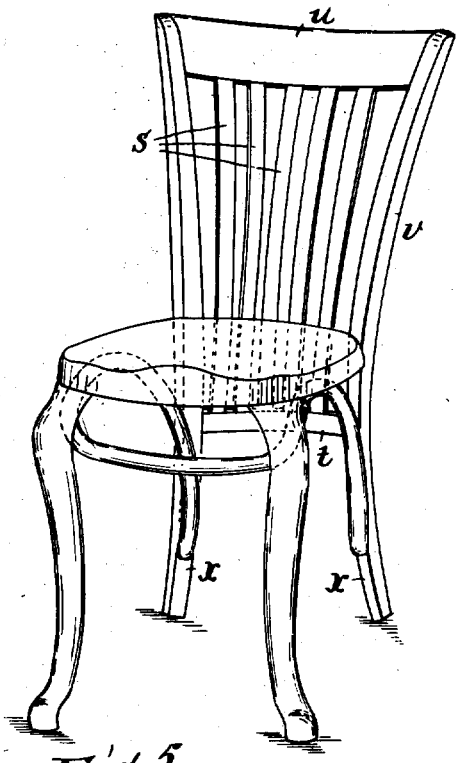

The invention will be found fully illustrated in the accompanying drawings, wherein, Figure 1 is a perspective view of one form of the improved chair as seen from the rear thereof; Fig. 2 is a cross-sectional view taken in the plane of the joint between one of the back-legs and the lower end of the structure forming the back and back-leg brace; Fig. 3 is a rear view of another form of the improved chair, the same having in this instance the ordinary ring-brace supporting its legs; Fig. 4 is a perspective view of a chair illustrating a modification of the invention; and, Fig. 5 is a similar view illustrating another modification.

Referring, first, to Figs. 1 and 2, the chair comprises the seat *a*, the front-legs *b*, and the bent-wood back and back-leg structure *c*, the same being secured together in the usual manner. The chair also comprises a brace *d* in the form of a single (preferably) piece of wood secured to the front legs, seat and back-legs and so bent as to produce the substantially straight middle portion *e*, connecting the front legs, and the upwardly arched end portions *f*, each connecting a front and a back-leg and bearing against the under side of the seat.

In carrying out my invention I provide a bracing structure which takes against the back-legs below the seat and rigidly sustains them against movement toward each other, said structure having a substantially straight form in side elevation; said structure may in some instances be also adapted to sustain the back and back-leg structure against movement relatively to the seat. In the figures of the drawings now being referred to, this brace or bracing structure is in the form of a single (preferably) piece of bent-wood *g* in the shape, generally, of an inverted U having its extremities substantially upright and being bent first inwardly toward each other, as at *h*, and then flaring, as at *i*. At the top of the brace it is secured in the usual manner to the top of the chair-back, as at *j*; the extremities are further secured, as by screws *k*, to the back of the seat *a* and, at their ends, to the legs, which may be doweled (Fig. 2) to receive said ends. The brace *g* being secured at its lower ends to the back-legs below the seat and in its upper portion to the top of the back, and being further, in the present instance, rigidly secured to the seat, the back-legs are supported against movement toward each other as well as against movement relatively to the seat, thus imparting to the chair as a whole perfect rigidity and insuring it against its parts working loose through sidewise or twisting strains.

In Fig. 3 substantially the same form of brace is shown as applied to a bent-wood chair of the well known type in which the legs are braced by means of a ring brace *l*. The extremities of the brace *m*, which is a counterpart of the brace *g*, may be secured, as shown, to both the seat and the ring brace, or either of them, and it has its ends doweled into the back-legs and secured thereto in a plane below the seat, the same as in Fig. 1.

In Fig. 4, a bracing structure *n* is shown which comprises the U-shaped bent-wood member *o* and the cross-piece *p*; the member *o* is secured at its top to the top of the back and it has its extremities doweled into or otherwise secured to the cross-piece, which latter is arranged below the seat *q* of the chair and is doweled into the legs *r* or otherwise secured thereto.

In Fig. 5 the bracing structure comprises the parallel members or spindles *s* and the cross-piece *t*, the members *s* being secured at their upper ends to the top piece *u* of the back *v* of the chair and at their lower ends being secured to the cross-piece *t*, which is disposed below the seat *w* and connects the back-legs *s*, being doweled into or otherwise secured to the same.

It will be observed that in Figs. 3, 4 and 5, as in Fig. 1, the back-legs being rigidly held against movement toward each other at a point below the seat, the chair is strengthened and reinforced in the same respect as that shown in Fig. 1.

I make no specific claim herein to the construction shown in Figs. 4 and 5, the same having been made the subject matter of a divisional application, Serial No. 476101.

Having thus fully described my invention, what I claim as new and desire to secure by Letters Patent is: —

1. The combination, with a chair having a seat, a back, back-legs and front legs, of a bracing structure having a substantially straight form in side elevation and attached to the back above the seat and also attached to the back-legs below the seat and holding said back-legs against movement toward each other, substantially as described.

2. The combination, with a chair having a seat, a back, back-legs and front legs, of a bracing structure having a substantially straight form in side elevation and attached to the back above the seat and also attached to the back-legs below the seat and bearing against the seat, substantially as described.

3. The combination, with a chair having a seat, a back, back-legs and front legs, of a bracing structure having a substantially straight form in side elevation and attached to the back above the seat and also attached to the back-legs below the seat and being also attached to the seat, substantially as described.

4. The combination, with a chair having a seat, an arched back and back-legs, of an inverted substantially U-shaped brace having a substantially straight form in side elevation and secured to the back above the seat and extending and secured below said seat to the back legs, said brace standing clear of both side portions of the back and the back-legs between the points of securing said brace above and below the seat, substantially as described.

5. The combination, with a chair having a seat, a back and back-legs, of an inverted substantially U-shaped brace having a substantially straight form in side elevation and secured to the seat and to the back above the seat and extending and secured below said seat to the back legs, substantially as described.

6. The combination, in a chair, of the seat, the front legs, the back and back-leg structure, and a substantially U-shaped brace secured to the back and back-leg structure above the seat and also secured to the seat and having its lower ends diverging and secured to the leg-portions of said back and back-leg structure below the seat, substantially as described.

7. The combination, with a chair having a seat, a back and back-legs, of a brace having a substantially straight form in side elevation and comprising downwardly projecting substantially upright portions, said brace being secured to the back above the seat and each of its downwardly projecting portions extending from above the seat to a back-leg below the seat and being secured to the latter below the seat, substantially as described.

8. The combination, with a chair having a seat, a back and back-legs, of a brace having a substantially straight form in side elevation and comprising downwardly projecting substantially upright portions, said brace being secured to the back above the seat and each of its downwardly projecting portions extending from above the seat to a back-leg below the seat and being secured to said seat and also to said back-leg below the seat, substantially as described.

9. The combination, with a chair, having a seat, a back, back legs and front legs, of a bracing structure having a substantially straight form in side elevation and attached to the back above the seat, said structure comprising downwardly projecting members having their lower end-portions relatively deflected and diverging from each other and respectively secured to the back legs below the seat, substantially as described.

10. The combination, with a chair, having a seat, a back, back legs and front legs, of a bracing structure having a substantially straight form in side elevation and attached to the back above the seat, said structure comprising downwardly projecting members having their lower end-portions relatively deflected and diverging from each other and respectively secured to the back legs below the seat, said members being also secured to the seat, substantially as described.

In testimony, that I claim the foregoing, I have hereunto set my hand, this 17th day of March, 1911.

ALBERT WANNER, Jr.

Witnesses:
C. L. Fink,
Wm. H. Kuntz.

Copies of this patent may be obtained for five cents each, by addressing the "Commissioner of Patents, Washington, D. C."